United States Patent [19]

Rybicki

[11] 3,759,632

[45] Sept. 18, 1973

[54] ARTICULATED HELICOPTER ROTOR

[75] Inventor: Robert C. Rybicki, Trumbull, Conn.

[73] Assignee: United Aircraft Corporation, East Hartford, Conn.

[22] Filed: July 5, 1972

[21] Appl. No.: 268,964

[52] U.S. Cl. .................................. 416/134, 416/141
[51] Int. Cl. ............................................ B64c 27/38
[58] Field of Search ................... 416/134, 141, 140, 416/107

[56] References Cited
UNITED STATES PATENTS

| | | | |
|---|---|---|---|
| 3,111,172 | 11/1963 | Gorndt et al................. | 416/141 UX |
| 3,282,350 | 11/1966 | Kisovec........................ | 416/134 UX |
| 3,292,712 | 12/1966 | Schmidt....................... | 416/134 UX |
| 3,501,250 | 3/1970 | Mosinskis..................... | 416/134 UX |
| 3,556,673 | 1/1971 | Killian.......................... | 416/134 |
| 3,700,352 | 10/1972 | Gorndt.......................... | 416/141 X |

FOREIGN PATENTS OR APPLICATIONS 934,336   1/1948   France............................... 416/134

Primary Examiner—Everette A. Powell, Jr.
Attorney—Vernon F. Hauschild

[57] ABSTRACT

One or more helicopter blades are supported from a helicopter rotor in articulated fashion by a spherical elastomeric bearing which permits blade motion about the blade lead-lag axis and which includes a piston-cylinder type lead-lag damper. Lead and lag stops positioned selected distances from the blade shaft so that during rotor start-up operation, the uncentered blade will increase in lead angle to eventually be supported by the lag stop and the bottomed-out damper piston and so that, during rotor braking operation, the uncentered blade will increase in lead angle and eventually be supported by the lead stop and the bottomed-out lead-lag damper. This construction does not include a centering bearing.

23 Claims, 11 Drawing Figures

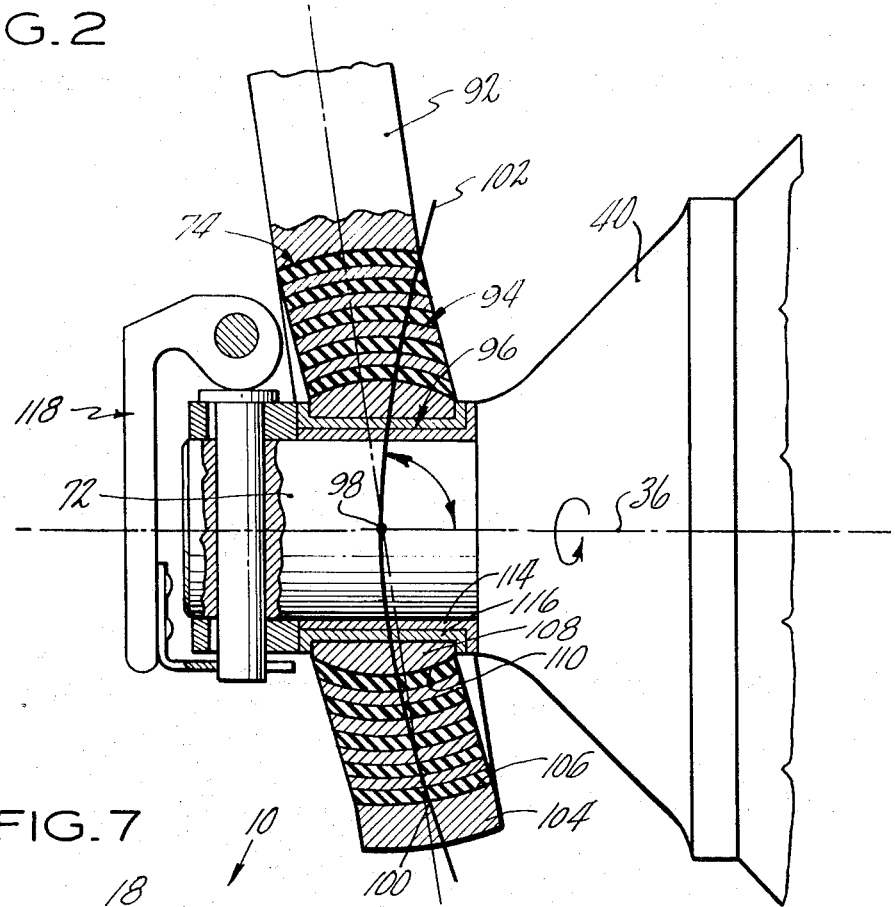
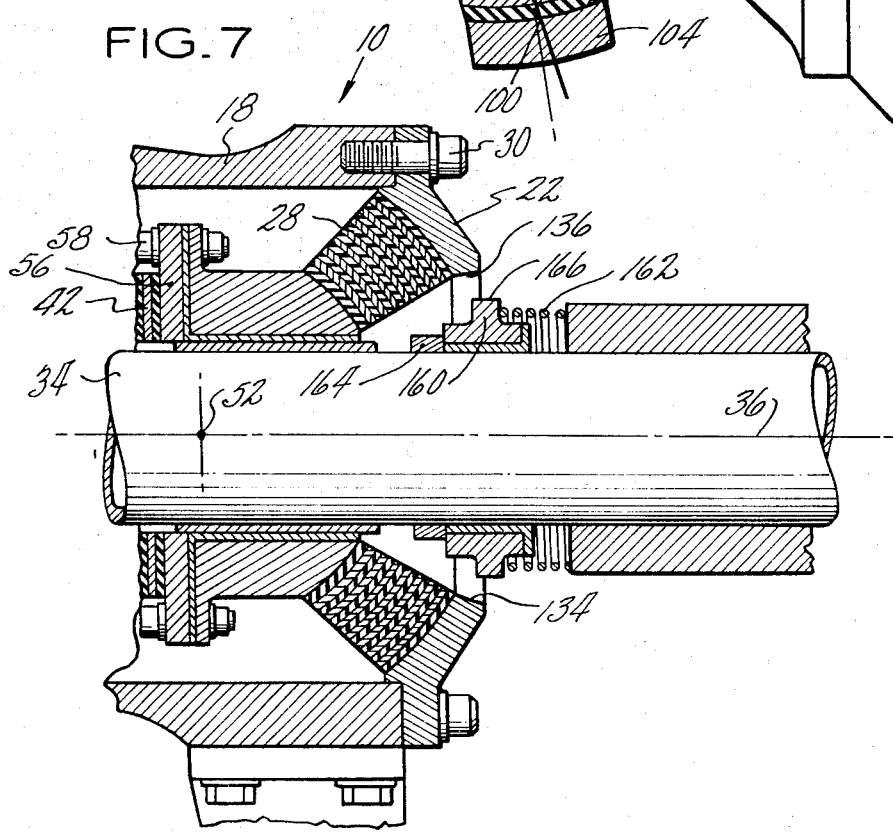

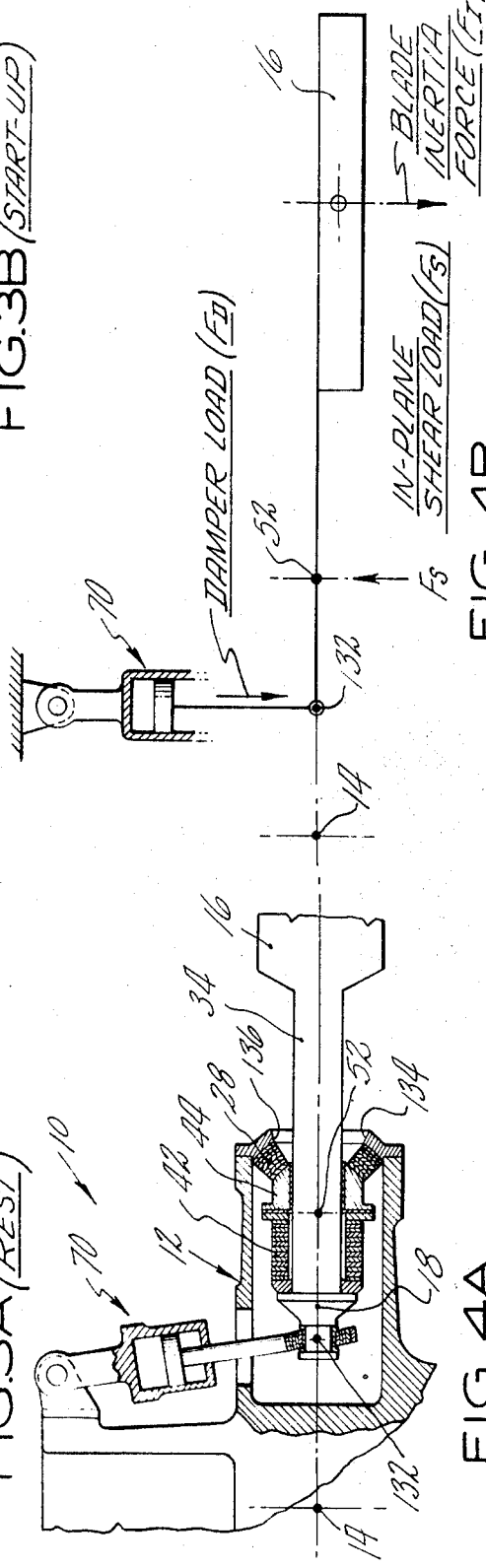
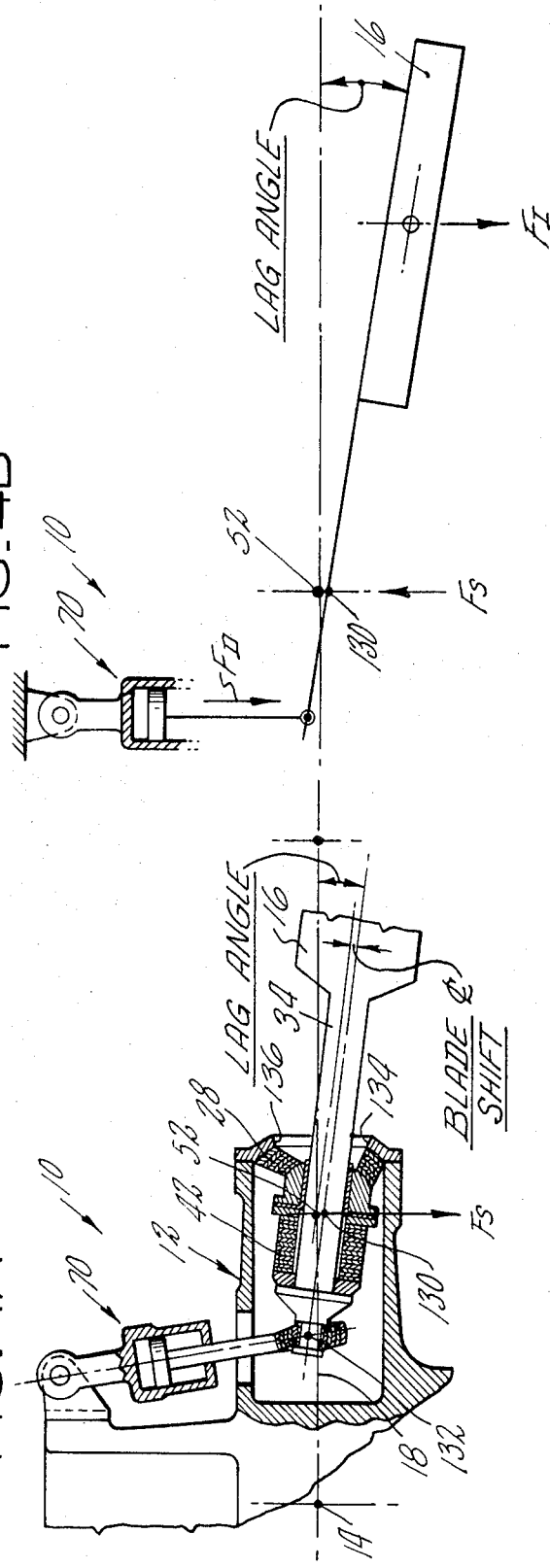

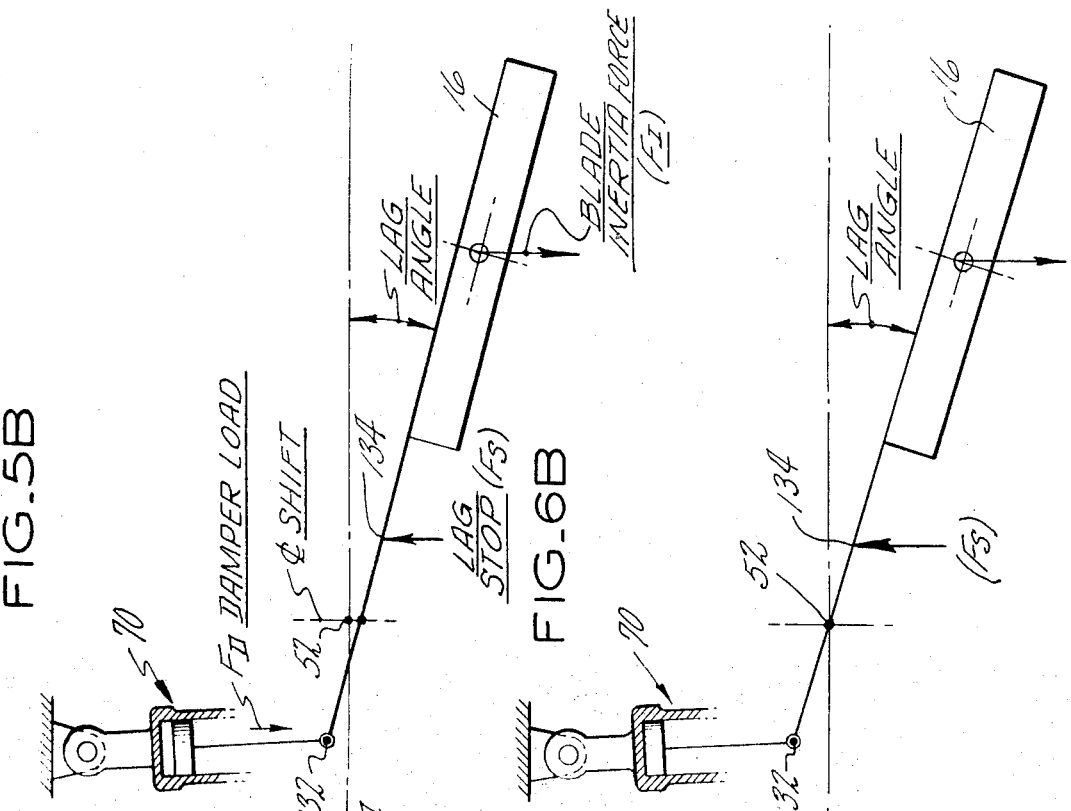
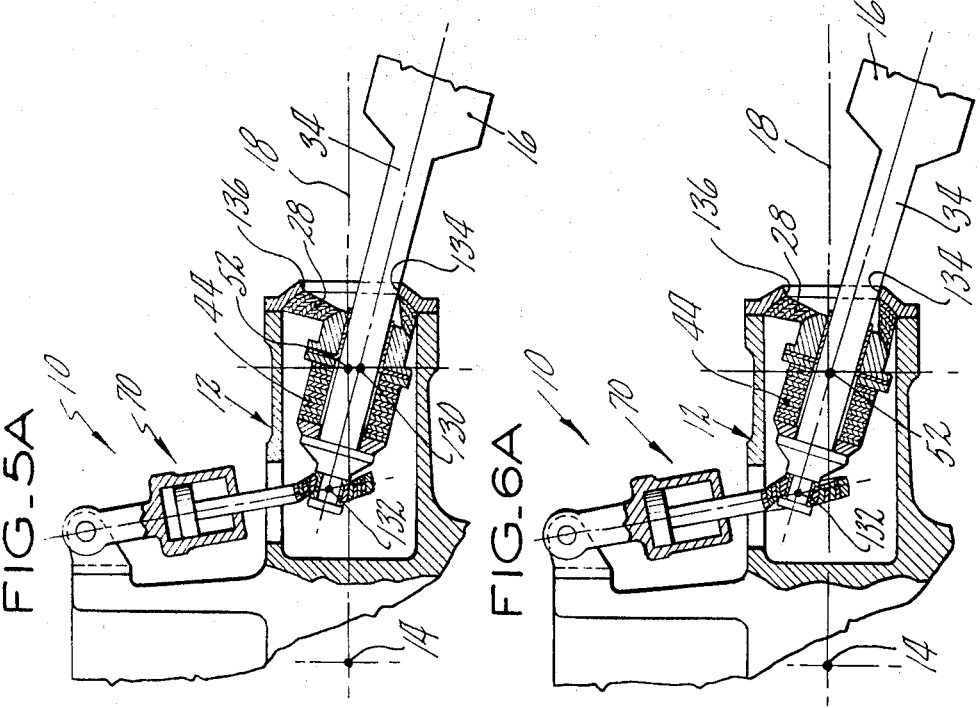

ARTICULATED HELICOPTER ROTOR

CROSS-REFERENCES TO RELATED APPLICATIONS

Subject matter shown and claimed in this application is shown and claimed in a copending application Ser. No. 268,963 entitled "Elastomeric Bearing for a Helicopter Rotor" filed on even date, a copending application Ser. No. 268,962 entitled "Articulated Helicopter Rotor Utilizing Plural Elastomeric Bearings for Articulated Support of the Blade from the Rotor Hub" filed on even date, and a copending application Ser. No. 268,965 entitled "Compound Bearing for Connecting a Helicopter Blade to a Helicopter Rotor" filed on even date.

BACKGROUND OF THE INVENTION

Field of the Invention

This invention relates to articulated helicopter rotors and more particular to the construction of said rotor in which an uncentered blade is eventually supported by lead or lag stops and the bottomed-out lead-lag damper piston during the rotor braking and rotor start-up modes of operation.

Description of the Prior Art

In the rotor head art, it was suggested in French Pat. No. 934,336 issued to Rene Dorand in 1948 that a helicopter blade be supported from the rotor by a spherical elastomeric bearing. Such a construction would provide no positive stops for the blade during the rotor start-up and rotor braking modes of operation so that the elastomeric bearing would be subjected to shear loads which would force it to shift laterally to the detriment of its operational integrity. U.S. Pat. Nos. 3,501,250 and 3,111,172 teach the use of a centering bearing for use with a spherical elastomeric bearing, however, these centering bearings are complicated in nature, add weight to the construction, and sometimes cannot be fitted into the space envelope provided so that their elimination would be desirable, considering the fact that they are used but for a short period of time during the rotor start-up and rotor braking modes of operation.

SUMMARY OF THE INVENTION

A primary object of the present invention is to teach a helicopter rotor construction which supports the blade from the hub through a spherical elastomeric bearing for rotation about the blade lead-lag axis and, which, without the aid of a centering bearing, utilizes a selectively positioned lag stop, lead stop and a selectively stroked lead-lag damper to provide two axially spaced fixed support points for the blade during rotor start-up and rotor braking operations.

In accordance with the present invention, the lead stop and lag stop are preferably part of a ring shaped member enveloping the blade end-shaft and the device includes a droop-stop ring which is centrifugal force responsive to be positioned with said ring shaped member to limit blade droop during rotor low rpm and rotor stop conditions, and to be forced out of alignment with said ring member during normal rotor operation so as not to impede blade articulated motion with respect to the rotor.

In accordance with the present invention, the blade is positively positioned between two fixed points before the structural integrity of the spherical elastomeric bearing is impaired by the high rotor shear forces imposed thereon.

Other objects and advantages of the present invention may be seen by referring to the following description and claims, read in conjunction with the accompanying drawings.

BRIEF DESCRIPTION OF THE DRAWINGS

FIG. 2 is an enlarged showing of the compound bearing connecting the blade lead-lag damper to the blade stub-shaft.

FIGS. 3a and 3b are showings of a helicopter blade connected to the hub through my bearing joint, with FIG. 3a showing the blade and its "at rest" or normal flight condition, and FIG. 3b constituting a diagrammatic representation of the forces acting upon the blade at the moment of rotor start-up.

FIGS. 4a and 4b are showings of the blade in an early stage of rotor start-up, with FIG. 4a showing the position of the blade in this early stage of rotor start-up and FIG. 4b illustrating the forces acting upon the blade during this early stage of rotor start-up.

FIGS. 5a and 5b correspond to FIGS. 4a and 4b but show the blade in a more advanced rotor start-up position and illustrates the forces acting thereon in this more advanced position of rotor start-up.

FIGS. 6a and 6b show the blade in its fully supported position during rotor start-up, with FIG. 6a showing the blade so positioned, and FIG. 6b diagrammatically showing the forces acting on the blade so positioned.

FIG. 7 is a showing of a droop stop which may be used with my joint.

DESCRIPTION OF THE PREFERRED EMBODIMENT

Figure 1:
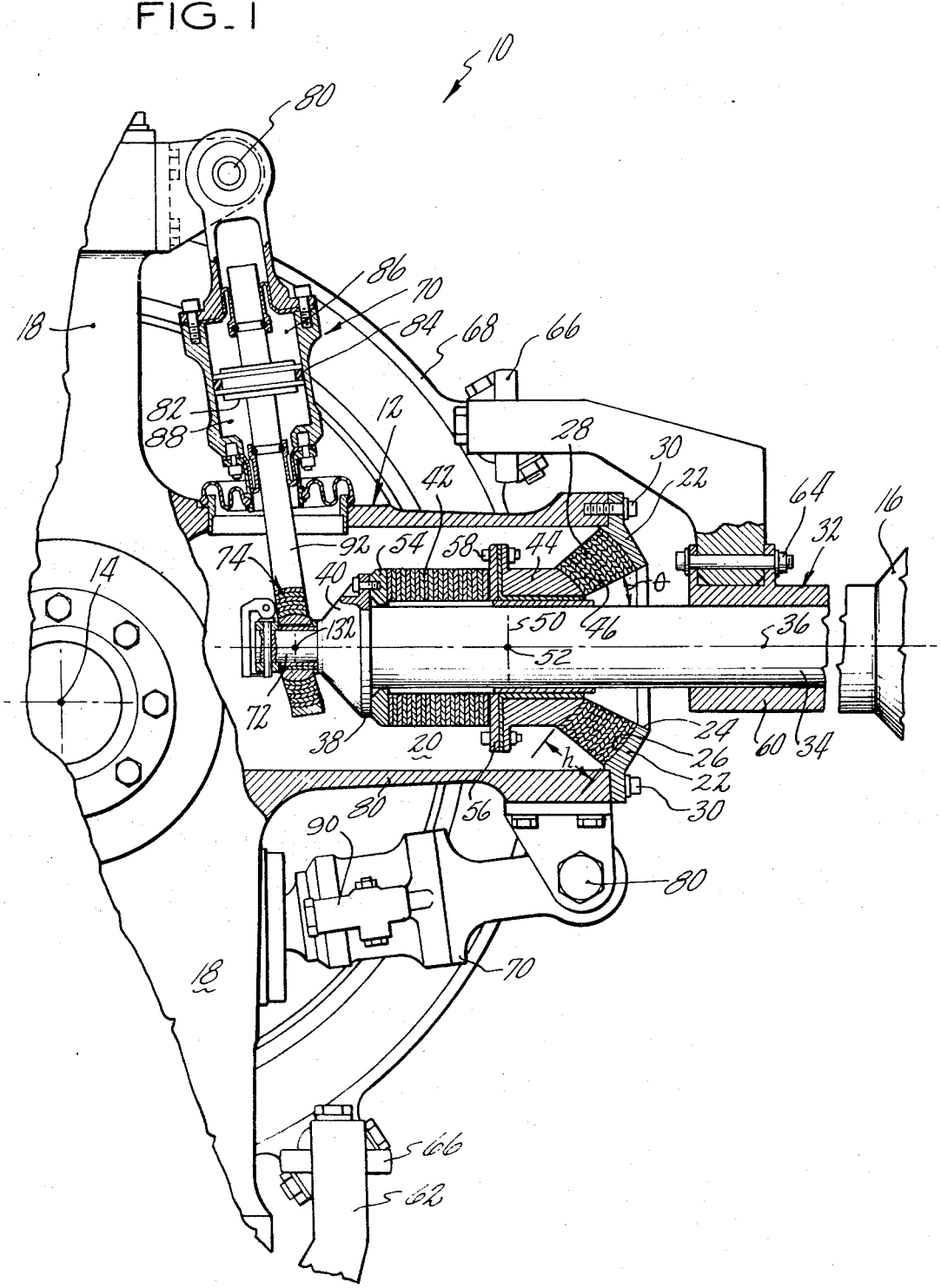
FIG. 1 is a top view of a portion of an articulated helicopter rotor head using my invention and partially broken away for purposes of illustration.

Referring to FIG. 1 of the drawings, we see a portion of helicopter articulated rotor head 10 which comprises hub member 12 mounted for rotation in conventional fashion about axis of rotation 14. A plurality of helicopter blades 16 are supported substantially radially from hub 12 for rotation therewith about axis 14 so as to generate lift for the helicopter in conventional fashion. It should be borne in mind that while a single blade is shown in the drawing, there are actually a number of such blades, possibly four. Hub 12 includes a chamber defining housing 18 for each blade which defines blade attachment chamber 20 therewithin. Housing 18 is preferably substantially cylindrical and extends substantially radially with respect to axis of rotation 14. Housing 18 may include as an integral part thereof mouth-shaped member 22 which defines a substantially circular opening 24 from chamber 22 and which also defines the spherical surface 26 of the outer race of the laminated spherical, annular, elastomeric bearing 28. Preferably, as shown in the drawing, the outer race member 22 is separate from and connected to housing 18 by conventional connecting means 30.

Blade 16 is connected to hub 12 by blade connecting means 32, which comprises shaft member 34 which is preferably positioned concentrically about the blade feathering or pitch change axis 36 and which has flanged or mushroom-shaped inner end 38. End 38 preferably includes a stub-shaft 40 which may be integral with shaft 34 or separate therefrom and connected thereto by conventional connecting means, not shown. Shaft 34 is connected to housing 18 through annular, flat or disc-type elastomeric bearing 42, connecting member 44, and annular spherical elastomeric bearing 28. Bearings 42 and 28 are preferably of the laminated type more fully disclosed in Hinks U.S. Pat. No. 2,900,182 with flat bearing 42 being of the type shown generally in FIG. 7 thereof and spherical bearing 28 being of the type shown generally in FIG. 8 thereof. Spherical bearing 28 comprises a plurality of spherically shaped laminates which are alternately elastomeric and rigid material, such as metal, and which are bonded together. The inner elastomeric laminate is bonded to spherical surface 46 of connector member 44. The spherical laminates and surfaces 46 and 26 are centered about the intersection of blade lead-lag axis 52 and blade flapping axis 50, which is perpendicular to axis 52, and which intersection also includes blade feathering axis 36. Bearing 42 consists of a stacked plurality of annular flat discs comprising alternately positioned elastomeric and metal disc members bonded together and with one end elastomeric disc bonded to race or end plate 54 and at the opposite end to race 56, which may be an integral part of connecting member 44 or connected thereto by conventional connecting means such as bolt and nut mechanism 58. The elastomeric discs of bearings 28 and 42 may be made of natural rubber, while the rigid discs are made of steel or titanium. At its opposite end, shaft 34 supports sleeve 60 which, in turn, supports blade 16 for rotation therewith about feathering axis 36. Pitch horn 62 is connected to sleeve 60 by conventional connecting means 64 and is connected at its opposite end to rod-end bearing 66 of the pitch control rod, which is connected at its opposite end in conventional fashion to conventional swashplate 68 so that swashplate motion causes the blades 16 to vary in pitch about axis 36 either collectively or cyclically.

It will therefore be seen that blade 16 is connected to hub 12 through sleeve 60, shaft 34, disc-type bearing 42, connector member 44 and spherical bearing 28, which connects to hub housing 18. It will also be noted that the elements just enumerated, including bearings 42 and 28 are positioned in series relationship to one another.

A shear bearing 71, which is of the plain bearing type, is shown positioned between shaft 34 and member 44, however, it should be noted that this construction uses no centering bearing for bearings 42 and 28.

A lead-lag damper 70, which is of the hydraulic or pneumatic cylinder-piston type, connects to journal portion 72 of stub-shaft portion 40 of shaft 34 through bearing member 74 and serves to dampen the lead-lad motion of blade 16 about lead-lag axis 52. Such a damper is provided for each blade.

With the rotor construction shown in FIG. 1, blade 16 is mounted so as to articulate with respect to hub 12 and has freedom of motion with respect to hub 12 about feathering axis 36 for pitch change motion, about lead-lag axis 52 for lead-lag motion, and about flapping axis 50 for flapping motion. The blade flapping motion, which has a range of about 30°, and the blade lead-lag motion, which has a range of about 20°, is accommodated by spherical bearing 28. The pitch change motion, which has a range of about 60°, cannot be accommodated by any single, practically sized elastomeric bearing and, because spherical bearing 28 and flat bearing 42 are connected in series, these two bearings share the pitch change motion of the blade. During normal rotor operation, spherical bearing 28 absorbs both the rotor in-plane shear loads and the rotor out-of-plane shear loads, while both bearings 42 and 28 react the blade centrifugal loading.

As stated previously, it is an object of my invention to provide a bearing in an articulated rotor which provides three degrees of freedom of the blade with respect to the rotor over substantial ranges of motion, and which can be contained within a minimal space envelope, thereby holding rotor weight and drag to a minimum. The prior art interlocking yoke design will not provide the minimal space envelope desired. It was therefore decided to pass the blade or its retainer through the bearing in an attempt to reduce the space envelope. While a single bearing construction might be utilized in a helicopter rotor having minimal blade motion, as by Dorand, it could not be utilized in the helicopter rotor of interest having a lead-lag range of about 20°, a flapping range of about 30°, and a pitch change range of about 60°. One of the limitations of an elastomeric bearing is the degree of motion which any one bearing can accommodate in any degree of freedom. To accommodate motion freedom over the extensive ranges of interest would have required a tremendously large single elastomeric bearing, and this would be intolerable from a minimum space envelope and rotor drag and weight standpoint. It was realized that a spherical bearing would be needed to provide blade freedom of motion about the lead-lag and flapping axes, however, because such a spherical bearing tapers away from thru-shaft 34 as shown at angle $\phi$ so as to increase the space envelope required for the bearing, an objective of this invention is to keep the height h of the spherical bearing to a minimum, and thereby maintain the bearing space envelope at a minimum. It was decided that a spherical bearing sized only to accommodate the required lead-lag and flapping motion would be of minimum height and would also be capable of accommodating a portion of the required pitch change motion. It was further decided that the remainder of required pitch change motion could be accommodated by a flat elastomeric disc bearing placed in series which would not increase the rotor space envelope.

An advantage of my in-series elastomeric bearing arrangement is that the torsional stiffness of bearings 28 and 42 can be controlled so that each bearing accommodates the proportional amount of pitch change motion desired to achieve the minimum rotor space envelope. The torsional stiffness of bearings 28 and 42 can be controlled by varying the size and thickness of the elastomeric laminates and by varying the durometer and shear modulus of the elastomer itself. The preferred stiffness ratio in the case of interest is 3:1 with bearing 28 accommodating 25 percent of the required pitch change motion and bearing 42 accommodating the remaining 75 percent of the required pitch change motion. Such a bearing stiffness ratio, while not essential to my bearing arrangement, provides the advantage of a minimal size spherical bearing 28, and thereby produces an arrangement of minimal space envelope.

Whether or not shear bearing 71 is required would depend upon the amount of rotor in-plane and rotor out-plane shear loads which must be passed through bearing 42 and the shear load capacity of bearing 42.

In a low shear load situation, shear bearing 71 would not be necessary and it should be borne in mind that bearing 71 merely serves to carry the shear loads of the rotor across bearing 42 and is not a centering bearing for the elastomeric bearings 42 and 28 insofar as it does not provide a fixed pivot for blade 16. In this bearing design, a centering bearing is not needed because bearing 28 provides the fixed pivot for blade 16 during normal operation. Larger excursions of blade 16 about the flap axis 50 and lead-lag axis 52 are restrained by the coaction of damper 70 and shaft 34 abutting fixed surface 24 of housing 18 or bearing outer race 22 so as to establish two hard points for blade support.

Lead-lag damper 70 is pivotally connected to hub 12 by conventional spherical joint 80 and is connected at its opposite end to the journal portion 72 of thru-shaft 34 by bearing 74. Damper 70 is basically a piston member 82 within cylinder 84 and hydraulic fluid is selectively conveyed between chambers 86 and 88 through conventional chamber connecting mechanism 90 so that damper 70 serves to dampen blade lead-lag motion about lead-lag axis 52.

A unique feature of this construction is the bearing 74 used to connect damper 70 to the blade. To be consistent from a bearing reliability standpoint, with the remaining bearings of the system, it was decided to substitute an elastomeric bearing for the conventional spherical rod-end bearing between damper piston shaft 92 and the journal portion 72 of thru-shaft 34. Because bearing 74 must be able to accommodate the pitch change motion of blade 16, together with other motions, and because this pitch change motion is as high as 60°, it was not possible to use a single elastomeric bearing in this location within reasonable space limitations because, as previously mentioned, an elastomeric bearing of given size is limited with respect to the amount of torsional motion which it can accommodate. Accordingly, as best shown in FIG. 2, bearing 74 comprises two parts, an elastomeric portion 94 enveloping a slip-type journal bearing portion 96. The arrangement of these two bearing portions is such that bearing 96 accommodates all pitch change motion with respect to damper rod 92 and elastomeric bearing 94 accommodates all misalignment motion between the blade thru-shaft 34 and damper piston rod 92. This misalignment motion which the elastomeric portion 94 of bearing 74 must accommodate is caused by the fact that as the blade moves in lead-lag motion, damper 70 is caused to pivot about its pivot point 80 and the center 98 of bearing 74 is caused to follow the arc described by the motion of center point 98 about the blade lead-lag axis 52, in other words, the arc between station 100 and 102 shown in FIG. 2. Accordingly, the angle between damper shaft 92 and blade 16 changes continuously between outboard ranges 100 and 102 as the blade moves in lead-lag motion and it is this change in angle between the damper shaft 92 and blade axis 36 which produces the misalignment in bearing 74 which the elastomeric portion 94 thereof must accommodate. All blade pitch change motion is accommodated in bearing 74 by the slip-type journal bearing portion 96 thereof, due to its low friction or low stiffness quality when compared to the torsional stiffness of elastomeric portion 94. The elastomeric portion 94 of bearing 74 consists of outer bearing race 104, which is substantially a ring connected to or projecting from damper shaft 92 and having a spherical inner surface 106 positioned concentrically about bearing center 98. Elastomeric bearing inner race 108 is supported concentrically about journal portion 72 of thru-shaft 34 by the slip-type journal bearing 97 and includes outer spherical surface 110, which is also centered about center 98. A plurality of spherical laminates of elastomer material and rigid material are alternately positioned between surfaces 110 and 106 and with the end elastomer laminates bonded thereto and bonded to each other in spherical elastomeric bearing fashion. The elastomer laminates may be made of natural rubber and the rigid laminates may be made of steel or titanium.

The slip-type journal bearing 96 is concentric sleeve arrangement with inner sleeve 114 which is is a by pinning or other convenient fashion to the journal portion 72 of shaft 34 and outer sleeve 116 is connected in some convenient fashion, such as pinning, to the inner race 108 of elastomeric bearing 94. The two sleeves 114 and 116 are of substantially U-shape cross section so as to be retained in concentric alignment about axis 36 and to be relatively movable with respect to one another. Conventional retaining mechanism 118 serves to retain sleeves 114 and 116 on shaft 36. Sleeves 114 and 116 are preferably made of steel and Teflon or carbon/ceramic.

It will accordingly be seen that bearing 74 is actually a double bearing construction, including elastomeric portion 94 and slip-type journal bearing 96 and that this construction achieves a small envelope rod-end bearing which has improved performance over a conventional all elastomeric rod-end bearing. The reason for the improved performance is the reduction in the shear strain in the elastomer of bearing 74. This reduction in shear strain in the elastomer is achieved by eliminating the requirement of the elastomer to absorb pitch change motion, as would be required in a single elastomeric bearing. In bearing 74, slip-type journal bearing 96 accommodates all pitch change motion, while elastomeric portion 94 thereof accommodates the required misalignment described supra. For these reasons, bearing 74 is superior to an all-elastomeric bearing in this environment. In addition, bearing 74 is superior to a spherical sliding bearing arrangement in this environment in that sleeves 114 and 116 are always in the same relationship to one another and therefore any solid lubricant or preferred bearing surfaces between the two parts remains intact and uncontaminated whereas, in the spherical bearing, the ball portion is intermittently exposed from the journal portion and any solid lubricant between the two is lost in this fashion and contaminates are admitted between the ball and journal.

It will therefore be seen that bearing 74 utilizes the best features of an elastomeric bearing in that the elastomeric portion thereof need not have large shear load carrying capabilities since it is not subject to pitch change motion, and the best features of a dry lubricated type of bearing since that portion of the bearing is a slip-type journal bearing and not the conventional spherical bearing.

Pitch control rod-end bearing 66 is preferably of the same construction as bearing 74 because it takes the same types of axial rotation and misalignment motions.

As is mentioned earlier, it is an important feature of my bearing construction, that a centering bearing is not used, thereby eliminating its attendant weight and mechanical complication. The previously identified French Pat. No. 934,336 to Dorand taught the concept of utilizing a spherical elastomeric bearing in this rotor head environment, however, there are certain operating conditions in a rotor, namely, the rotor starting and the rotor braking conditions, when the spherical elastomeric bearing needs assistance from other sources in carrying shear loads for reasons to be explained hereinafter. U.S. Pat. Nos. 3,501,250 and 3,111,172 provided this assistance to the spherical elastomeric bearing by utilizing centering bearings together therewith. The centering bearings are heavy, tend to be complicated, and are utilized only during the short term regimes of rotor starting and rotor braking, and perform no useful function during the normal operation of the rotor. Further, space limitations may make the incorporation of a centering bearing difficult or impossible in the preferred embodiment. It is therefore an important teaching of this application to eliminate centering bearings by utilizing the blade-to-hub bearing combination taught herein. For an explanation of how my rotor is constructed so as to afford assistance to the spherical bearing 28 during the rotor starting and braking operation reference will now be made to FIGS. 3a and 3b through FIGS. 6a and 6b. Considering FIG. 3a as initially representing the condition of the rotor during normal flight operation, spherical bearing 28 is under high centrifugal loading so that the laminates thereof are heavily compacted and have high shear load carrying capacity such that small angular deflections, due to lead-lag or flapping of the blade, are reacted by the spherical bearing 28. When the rotating rotor is braked, or when the rotor which is at rest is started, the centrifugal load is very low due to the slow rotor speed, yet the rotor torque is high due to the starting or braking rotor in-plane shear forces generated by the rotor changing speed and imparting that change to the blades. The low centrifugal force loading of the spherical bearing 28 causes the spherical bearing to lose its compaction and hence its good shear load carrying capabilities and high in-plane rotor shear forces cause the bearing to yield laterally. We must accordingly compensate for this starting and braking condition situation and a description of my alternative to the use of a centering bearing will now be made.

Considering a rotor starting or start-up situation, wherein it may be considered that the rotor of FIG. 3a is at rest, when the rotor hub 12 commences to rotate, it imparts in-plane shear load $F_S$ to the blade at the blade lead-lag axis 52 and the inertia of blade 16 imparts force $F_I$ at the blade C.G. while the lead-lag damper 70 imparts a damper load $F_D$ in the directions shown in FIG. 3b. Lead-lag axis accordingly becomes the pivot point for blade 16 for loads $F_D$ and $F_I$ to act about and, due to the superiority of force $F_I$, the blade commences to rotate in a clockwise direction about pivot point 52. Under this force balance condition, the blade will pivot clockwise to its FIG. 4a and 4b position wherein the blade has moved through the lag angle indicated and, because the forces acting on the blade have overcome the shear load carrying capability of spherical bearing 28 the bearing has yielded laterally and the blade centerline shifts laterally so that the blade center of flexure shifts from lead-lag axis 52 to station 130 as shown in FIG. 4b. The piston of damper 70 is being forced toward its bottom-out position as blade 16 moves from its FIG. 3a to its FIG. 4a position. As the clockwise motion of blade 16 continues beyond the FIG. 4a position, the blade will eventually bottom-out on lag stop 134, as shown in FIGS. 5a and 5b and it will be noted that lag stop 134 is positioned radially outward or to the right of lag axis 52. This bottoming-out of the blade on lag stop 134 relieves, at least in part, the shear loading on the spherical bearing 28, and although the lag angle has increased between the FIG. 4 and 5 positions, the piston of damper 70 has not yet bottomed-out. As blade 16 now pivots about lag stop 134, the damper piston eventually bottoms-out so as to give the blade 16 two hard stops, namely, lag stop 134 and point 132 of the bottomed-out damper 70, thereby completely relieving spherical bearing 28 of its shear loading. In practice, when blade 16 engages lag stop 134 in the FIG. 5 condition, the in-plane rotor shear load reaction shifts from the spherical bearing to the stop 134 and as the damper 70 bottoms-out as shown in FIG. 6 the blade centerline reverts to its original position, so that blade 16 is again supported about the point of intersection of axes 36, 50 and 52, with the centerline of shaft 34 passing therethrough, blade lag motion stops suddenly and damper 70 loads and blade inertia peak at a very high point.

In my preferred embodiment, a centrifugally responsive droop stop mechanism is utilized of the type shown in FIG. 7. So as to limit the amount of droop which the blade can experience in its stopped or very low speed mode of operation, droop stop ring 160 is utilized. Ring 160 is slidably received on thru-shaft 34 and is spring biased by spring member 162 to its operable position shown in FIG. 7, which position is assumed when the blade is at stop or at very low rpm. Positive stop ring 164 cooperates with spring 162 to position the land 166 of droop stop ring 160 to be in alignment with the surface of the bearing outer race 22 which defines droop stop and flap stop. Accordingly, when the speed of blade 16 is reduced a sufficient amount, spring 162 forces droop stop ring 166 against positive ring 164 so as to place land 166 into alignment with surface and thereby limit the amount of droop which the blade can experience between the operating regime shown in FIG. 7 and the regime in which land 166 contacts surface. When the helicopter rotor 10 starts up, and gains sufficient rpm, centrifugal force acting on droop stop ring 160 overcomes the force of spring 162 and forces droop stop 160 out of alignment with surface 134–136, thereby permitting greater flapping and lead-lag motion of the blade in flight than is permitted in droop motion when in the low rpm or stopped mode of operation.

It will therefore be seen that in the rotor start-up operation, as rotor starting torque is applied, the inertia of the blade causes the blade to begin to rotate about its lag axis. This lag motion will continue until such point that it is arrested by some means. If blade 16 were allowed to increase the lag angle in this fashion, damper 70 would eventually bottom-out and cause a rapid deceleration in blade motion about the lag axis which would cause very high impact loads to be placed upon the blade and rotor system. This very high impact loading is beyond the capability of spherical bearing 28 in shear, so we accordingly provide hard stop 134 to cooperate with the bottomed-out damper in carrying this load.

It will be evident that the loading on bearing 28 during the rotor braking operation is just the opposite of that shown in FIGS. 3 and 6 which illustrate the rotor start-up operation, so that piston 70 bottoms-out at the opposite end of its stroke from the FIG. 6 showing and so that blade 16 bottoms out at lead stop 136.

It will accordingly be seen that the aforementioned French patent to Dorand has a serious problem in the starting and braking modes of operation and that while U.S. Pat. Nos. 3,501,250 and 3,111,172 utilize centering bearings in combination with the spherical bearing to solve this problem, I have eliminated the need for the spherical bearing, thereby providing a lighter and less expensive construction.

I wish it to be understood that I do not desire to be limited to the exact details of construction shown and described, for obvious modifications will occur to a person skilled in the art.

I claim:

1. An articulated helicopter rotor comprising:
   A. a rotatable hub member adapted to be mounted for rotation about an axis and having:
      1. a chamber defining member shaped to define a blade attachment chamber and to further define a substantially circular aperture of selected size at said chamber radially outer end, and further being shaped to present a spherical surface along the inner surface thereof, which spherical surface is centered about the intersection of the blade lead-lag and flapping axes,
   B. blade attachment means including:
      1. a shaft member positioned concentrically about the blade feathering axis and extending from within said chamber through said aperture at selected clearance therefrom and outwardly thereof for attachment to and support of the helicopter blade and being flange shaped at its radial inner end within said chamber,
      2. bearing means connecting said shaft member to said chamber defining member and including:
         a. a spherical, laminated elastomeric bearing with the laminates thereof centered about said lead-lag and flapping axes intersection and being annular in shape so as to envelop said shaft member in spaced relation thereto and with the outer laminate thereof connected to said chamber defining member spherical surface to form a bearing outer race,
         b. a flat, laminated elastomeric bearing and being annular in shape so as to envelop said shaft in spaced relation thereto and comprising a plurality of stacked, flat annular discs connected to said shaft flange at one of its ends and extending toward said spherical bearing,
         c. a connecting member enveloping said shaft member in spaced relation thereto and positioned said spherical elastomeric bearing and said flat elastomeric bearing and shaped at one of its ends to be spherical and centered about said flapping and lead-lag axes intersection and connected to said spherical elastomeric bearing so as to serve as the inner race thereof and being connected to said flat elastomeric bearing at the opposite end thereof so that said spherical elastomeric bearing and said flat elastomeric bearing are connected in series relationship between said shaft member and said chamber defining means and so that said spherical elastomeric bearing accommodates blade motion about the lead-lag and the flapping axes and so that said spherical elastomeric bearing and said flat elastomeric bearing cooperate to carry blade centrifugal loading and further cooperate to share blade pitch-change motion, and
   C. a hydraulic or pneumatic cylinder-piston lead-lag damper of selected stroke pivotally connected to said hub member and pivotally connected to said shaft member at a station radially spaced from the lead-lag axis so that during rotor start-up operation the blade will pivot about its lead-lag axis to increase in lag angle while forcing the damper piston toward a first end of its selected stroke until the shaft member first contacts said hub member aperture to form a first fixed blade positioning point and then pivots thereabout until said damper piston bottoms-out at said first end of its stroke to provide a second fixed blade positioning point spaced from said first point and, further, so that during rotor braking operation the blade will pivot about its lead-lag axis to increase in lead angle while forcing the damper piston toward a second end of its selected stroke until the shaft member first contacts said hub member aperture to form a first fixed blade positioning point and then pivots thereabout until said damper piston bottoms-out at said second end of its stroke to provide a second fixed blade positioning point spaced from said first point.

2. An articulated helicopter rotor adapted to mount one or more helicopter blades to extend substantially radially therefrom for motion about a blade feathering axis and intersecting blade lead-lag and blade flapping axes including:
   A. a rotor hub adapted to be mounted for rotation about an axis of rotation,
   B. blade attachment means including:
      1. an annular, spherical, elastomeric bearing having:
         a. an outer spherical race connected to said hub and shaped to define a central opening enveloping the blade feathering axis,
         b. an inner spherical race shaped to define a central opening positioned concentrically about the blade feathering axis, and with the spherical surfaces of the inner and outer race centered about the intersection of the blade flapping and lead-lag axes,
      2. an annular, disc-type, laminated, elastomeric bearing having a central opening enveloping the blade feathering axis and with the disc-shaped laminates thereof lying in-plane perpendicular thereto,
      3. means connecting said spherical and disc-type elastomeric bearings so that they are joined in series, and
      4. a shaft member adapted to connect to the blade and extending along the blade feathering axis and passing through said spherical bearing and disc-type bearing central openings and connecting at its radially inner end to said stack-type bearing so that said blade carrying shaft member is supported from said hub through said in-series bearings with freedom of motion about the blade feathering, lead-lag and flapping axes and with the spherical bearing accommo-dating the lead-lag and flapping motions and with the two bearings cooperating to share the pitch change motion, C. a hydraulic or pneumatic cylinder-piston lead-lag damper of selected stroke pivotally connected to said hub and pivotally connected to said shaft member at a station radially spaced from the lead-lag axis, D. a blade lag stop connected to said hub and positioned a selected distance from said shaft member normal operating position so that during rotor start-up operation the blade will pivot about its lead-lag axis to increase in lag angle while forcing the damper piston toward a first end of its selected stroke until the shaft member first contacts said lag stop to form a first fixed blade positioning point and then pivots thereabout until said damper piston bottoms-out at said first end of its stroke to provide a second fixed blade positioning point spaced from said first point, E. a blade lead stop connected to said hub and positioned a selected distance from said shaft member normal operating position so that during rotor braking operation the blade will pivot about its lead-lag axis to increase the lead angle while forcing the damper piston toward a second end of its selected stroke until the shaft member first contacts said lead stop to form a first fixed blade positioning point and then pivots thereabout until said damper piston bottoms-out at said second end of its stroke to provide a second fixed blade positioning point spaced from said first point.

3. In an articulated helicopter rotor wherein the helicopter blades are supported substantially radially from a rotatable hub for rotation therewith about an axis of rotation and for motion with respect thereto about a lead-lag axis, a flapping axis and a feathering axis, the improvement of a joint connecting the blade to the hub comprising:

A. an annularly shaped, laminated, elastomeric spherical bearing having inner and outer races and stacked laminates of spherical shape centered about the intersection of the lead-lag and flapping axes and positioned substantially concentrically about the feathering axis, B. an annularly shaped, disc-type elastomeric bearing comprising a stack of annular, flat disc laminates positioned substantially concentrically about the feathering axis, C. an annular connecting member concentrically enveloping the feathering axis and connected to the inner race of said spherical bearing and further connected to one end of the stacked discs of said disc-type bearing so as to connect said bearings in series, D. a thru-shaft passing through said spherical bearing, connecting member and disc-type bearing and adapted to be connected at one end to the helicopter blade and connected at its opposite end to the opposite end of the disc-type bearing, E. means connecting said spherical bearing outer race to said hub so that said blade is supported from said hub through said joint so as to be capable of lead-lag and flapping motion which is accommodated through the torsional motion of said spherical bearing, and so as to also be capable of pitch change motion which is accommodated through the cooperation of said disc-type bearing and said spherical bearing and so that both of said bearings cooperate to impart the blade centrifugal loads to the hub, F. a hydraulic or pneumatic cylinder-piston lead-lag damper of selected stroke pivotally connected to said hub and pivotally connected to said thru-shaft at a station radially spaced from the lead-lag axis, G. a blade lag stop connected to said hub and positioned a selected distance from said thru-shaft normal operating position so that during rotor start-up operation the blade will pivot about its lead-lag axis to increase in lag angle while forcing the damper piston toward a first end of its selected stroke until the thru-shaft first contacts said lag stop to form a first fixed blade positioning point and then pivots thereabout until said damper piston bottoms-out at said first end of its stroke to provide a second fixed blade positioning point spaced from said first point, and H. a blade lead stop connected to said hub and positioned a selected distance from said thru-shaft normal operating position so that during rotor braking operation the blade will pivot about its lead-lag axis to increase in lead angle while forcing the damper piston toward a second end of its selected stroke until the thru-shaft first contacts said lead stop to form a first fixed blade positioning point and then pivots thereabout until said damper piston bottoms-out at said second end of its stroke to provide a second fixed blade positioning point spaced from said first point.

4. In an articulated helicopter rotor wherein the helicopter blades are supported substantially radially from a rotatable hub for rotation therewith about an axis of rotation and for motion with respect thereto about a lead-lag axis, a flapping axis and a feathering axis, the improvement of a joint connecting the blade to the hub comprising:

A. a spherical elastomeric bearing having inner and outer races and elastomeric filler therebetween of spherical shape centered about the intersection of the lead-lag and flapping axes, B. a disc-type elastomeric bearing, C. a connecting member connected to the inner race of said spherical bearing and further connected to one end of said disc-type bearing so as to connect said bearings in series, D. a thru-shaft passing through said spherical bearing, connecting member and disc-type bearing and adapted to be connected at one end to the helicopter blade and connected at its opposite end to the opposite end of the disc-type bearing, E. means connecting said spherical bearing outer race to the hub so that said blade is supported from said hub through said joint so as to be capable of lead-lag and flapping motion which is accommodated through the torsional motion of said spherical bearing, and so as to also be capable of pitch change motion which is accommodated through the cooperation of said disc-type bearing and said spherical bearing and so that both of said bearings cooperate to impart the blade centrifugal loads to the hub, F. a hydraulic or pneumatic cylinder-piston lead-lag damper of selected stroke pivotally connected to the hub and pivotally connected to said thru-shaft at a station radially spaced from the lead-lag axis, G. a blade lag stop connected to the hub and positioned a selected distance from said thru-shaft normal operating position so that during rotor start-up operation the blade will pivot about its lead-lag axis to increase in lag angle while forcing the damper piston toward a first end of its selected stroke until the thru-shaft first contacts said lag stop to form a first fixed blade positioning point and then pivots thereabout until said damper piston bottoms-out at said first end of its stroke to provide a second fixed blade positioning point spaced from said first point, and H. a blade lead stop connected to said hub and positioned a selected distance from said thru-shaft normal operating position so that during rotor braking operation the blade will pivot about its lead-lag axis to increase in lead angle while forcing the damper piston toward a second end of its selected stroke until the thru-shaft first contacts said lead stop to form a first fixed blade positioning point and then pivots thereabout until said damper piston bottoms-out at said second end of its stroke to provide a second fixed blade positioning point spaced from said first point.

5. An articulated helicopter rotor comprising:
A. a rotatable hub member adapted to be mounted for rotation about an axis and having:
  1. a chamber defining member shaped to define a blade attachment chamber and to further define a substantially circular aperture of selected size at said chamber radially outer end, and further being shaped to present a spherical surface along the inner surface thereof, which spherical surface is centered about the intersection of the blade lead-lag and flapping axes,
B. blade attachment means including:
  1. a shaft member positioned concentrically about the blade feathering axis and extending from within said chamber through said aperture at selected clearance therefrom and outwardly thereof for attachment to and support of the helicopter blade and being flange shaped at its radial inner end within said chamber,
  2. bearing means connecting said shaft member to said chamber defining member and including:
    a. a spherical, laminated elastomeric bearing having an outer race connected to said rotor hub member and the inner race thereof connected to said shaft member and with the laminates thereof centered about said lead-lag and flapping axes intersection and being annular in shape so as to envelop said shaft member in spaced relation thereto and with the outer laminate thereof connected to said chamber defining member spherical surface to form a bearing outer race,
C. a hydraulic or pneumatic cylinder-piston lead-lag damper of selected stroke pivotally connected to said hub member and pivotally connected to said shaft member at a station radially spaced from the lead-lag axis, so that during rotor start-up operation the blade will pivot about its lead-lag axis to increase in lag angle while forcing the damper piston toward a first end of its selected stroke until the shaft member first contacts said hub member aperture to form a first fixed blade positioning point and then pivots thereabout until said damper piston bottoms-out at said first end of its stroke to provide a second fixed blade positioning point spaced from said first point and, further, so that during rotor braking operation the blade will pivot about its lead-lag axis to increase in lead angle while forcing the damper piston toward a second end of its stroke until the shaft member first contacts said hub member aperture to form a first fixed blade positioning point and then pivots thereabout until said damper piston bottoms-out at said second end of its stroke to provide a second fixed blade positioning point spaced from said first point.

6. An articulated helicopter rotor adapted to mount one or more helicopter blades to extend substantially radially therefrom for motion about a blade feathering axis and intersecting blade lead-lag and blade flapping axes including:
A. a rotor hub adapted to be mounted for rotation about and axis of rotation,
B. blade attachment means including:
  1. an annular, spherical, elastomeric bearing having:
    a. an outer spherical race connected to said hub and shaped to define a central opening enveloping the blade feathering axis,
    b. an inner spherical race shaped to define a central opening positioned concentrically about the blade feathering axis, and with the spherical surfaces of the inner and outer race centered about the intersection of the blade flapping and lead-lag axes,
  2. a shaft member connected to said spherical elastomeric bearing inner race and adapted to connect to the blade and extending along the blade feathering axis and passing through said spherical bearing central opening and connecting at its radially inner end to said spherical bearing so that said blade carrying shaft member is supported from said hub through said spherical bearing with freedom of motion about the blade feathering, lead-lag and flapping axes,
C. a hydraulic or pneumatic cylinder-piston lead-lag damper of selected stroke pivotally connected to said hub and pivotally connected to said shaft member at a station radially spaced from the lead-lag axis,
D. a blade lag stop connected to said hub and positioned a selected distance from said shaft member normal operating position so that during rotor start-up operation the blade will pivot about its lead-lag axis to increase in lag angle while forcing the damper piston toward a first end of its selected stroke until the shaft member first contacts said lag stop to form a first fixed blade positioning point and then pivots thereabout until said damper piston bottoms-out at said first end of its stroke to provide a second fixed blade positioning point spaced from said first point,
E. a blade lead stop connected to said hub and positioned a selected distance from said shaft member normal operating position so that during rotor braking operation the blade will pivot about its lead-lag axis to increase in lead angle while forcing the damper piston toward a second end of its selected stroke until the shaft member first contacts said lead stop to form a first fixed blade positioning point and then pivots thereabout until said damper piston bottoms-out at said second end of its stroke to provide a second fixed blade positioning point spaced from said first point.

7. In an articulated helicopter rotor wherein the helicopter blades are supported substantially radially from a rotatable hub for rotation therewith about an axis of rotation and for motion with respect thereto about a lead-lag axis, a flapping axis and a feathering axis, the improvement of a joint connecting the blade to the hub comprising:
   A. an annularly shaped, laminated, elastomeric spherical bearing having inner and outer races and stacked laminates of spherical shape centered about the intersection of the lead-lag and flapping axes and positioned substantially concentrically about the feathering axis,
   B. a thru-shaft passing through said spherical bearing, and adapted to be connected at one end to the helicopter blade and connected at its opposite end to said spherical bearing inner race,
   C. means connecting said spherical bearing outer race to said hub so that said blade is supported from said hub through said joint so as to be capable of lead-lag and flapping motion which is accommodated through the torsional motion of said spherical bearing, and so as to also be capable of pitch change motion,
   D. a hydraulic or pneumatic cylinder-piston lead-lag damper of selected stroke pivotally connected to the hub and pivotally connected to said thru-shaft at a station radially spaced from the lead-lag axis,
   E. a blade lag stop connected to said hub and positioned a selected distance from said thru-shaft normal operating position so that during rotor start-up operation the blade will pivot about its lead-lag axis to increase in lag angle while forcing the damper piston toward a first end of its selected stroke until the thru-shaft first contacts said lag stop to form a first fixed blade positioning point and then pivots thereabout until said damper piston bottoms-out at said first end of its stroke to provide a second fixed blade positioning point spaced from said first point,
   F. a blade lead stop connected to said hub and positioned a selected distance from said thru-shaft normal operating position so that during rotor braking operation the blade will pivot about its lead-lag axis to increase in lead angle while forcing the damper piston toward a second end of its selected stroke until the thru-shaft first contacts said lead stop to form a first fixed blade positioning point and then pivots thereabout until said damper piston bottoms-out at said second end of its stroke to provide a second fixed blade positioning point spaced from said first point.

8. In an articulated helicopter rotor wherein the helicopter blades are supported substantially radially from a rotatable hub for rotation therewith about an axis of rotation and for motion with respect thereto about a lead-lag axis, a flapping axis and a feathering axis, the improvement of a joint connecting the blade to the hub comprising:
   A. a spherical elastomeric bearing having inner and outer races and elastomer filler therebetween of spherical shape centered about the intersection of the lead-lag and flapping axes,
   B. a thru-shaft passing through said spherical bearing, and adapted to be connected at one end to the helicopter blade and connected at its opposite end to the spherical bearing inner race,
   C. means connecting said spherical bearing outer race to the hub so that said blade is supported from said hub through said joint so as to be capable of lead-lag and flapping motion which is accommodated through the torsional motion of said spherical bearing, and so as to also be capable of pitch change motion,
   D. a hydraulic or pneumatic cylinder-piston lead-lag damper of selected stroke pivotally connected to the hub and pivotally connected to said thru-shaft at a station radially spaced from the lead-lag axis,
   E. a blade lag stop connected to the hub and positioned a selected distance from said thru-shaft normal operating position so that during rotor start-up operation the blade will pivot about its lead-lag axis to increase in lag angle while forcing the damper piston toward a first end of its selected stroke until the thru-shaft first contacts said lag stop to form a first fixed blade positioning point and then pivots thereabout until said damper piston bottoms-out at said first end of its stroke to provide a second fixed blade positioning point spaced from said first point, and
   F. a blade lead stop connected to said hub and positioned a selected distance from said thru-shaft normal operating position so that during rotor braking operation the blade will pivot about its lead-lag axis to increase in lead angle while forcing the damper piston toward a second end of its selected stroke until the thru-shaft first contacts said lead stop to form a first fixed blade positioning point and then pivots thereabout until said damper piston bottoms-out at said second end of its stroke to provide a second fixed blade positioning point spaced from said first point.

9. An articulated helicopter rotor having:
   A. a hub member mounted about an axis for rotation,
   B. at least one helicopter blade projecting substantially radially from said hub member for rotation therewith and having an end-shaft projecting towards said hub,
   C. a spherical elastomeric bearing supporting said blade end-shaft for pivotal motion about the blade lead-lag axis and carrying blade centrifugal loads during normal rotor operation,
   D. a hydraulic or pneumatic cylinder-piston lead-lag damper of selected stroke pivotally connected to said hub and pivotally connected to said blade end-shaft at a station radially spaced from the lead-lag axis,
   E. a blade lag stop connected to said hub and positioned a selected distance from said end-shaft normal operating position so that during rotor start-up operation the blade will pivot about its lead-lag axis to increase in lag angle while forcing the damper piston toward a first end of its selected stroke until the end-shaft first contacts said lag stop to form a first fixed blade positioning point and then pivots thereabout until said damper piston bottoms-out at said first end of its stroke to provide a second fixed blade positioning point spaced from said first point, and
   F. a blade lead stop connected to said hub and positioned a selected distance from said end-shaft normal operating position so that during rotor braking operation the blade will pivot about its lead-lag axis to increase in lead angle while forcing the damper piston toward a second end of its selected stroke until the end-shaft first contacts said lead stop to form a first fixed blade positioning point and then pivots thereabout until said damper piston bottoms-out at said second end of its stroke to provide a second fixed blade positioning point spaced from said first point.

10. A rotor according to claim 9 wherein said spherical elastomeric bearing and said damper connection constitute the only lateral support for the blade during normal operation.

11. A rotor according to claim 10 wherein said lag stop and said lead stop are part of a ring-shaped member enveloping said end-shaft.

12. A rotor according to claim 11 wherein said ring-shaped member forms the outer race of said elastomeric bearing.

13. A rotor according to claim 9 wherein said damper connects to said blade end-shaft at a station radially inboard of the lead-lag axis.

14. A rotor according to claim 13 and including a centrifugal force response droop stop ring sleeved onto said end-shaft and positioned a selected distance inboard of said ring-shaped member so as to serve as a blade droop stop in cooperation with said ring member during a blade low rpm or stopped condition, and which moves out of alignment with said ring member during normal rotor operation so as not to impede blade articulated motion with respect to the hub.

15. A rotor according to claim 1 wherein the stroke of said lead-lag damper and the dimension and location of said hub member aperture are selected so that when said shaft member is positioned by said first fixed blade positioning point and said second fixed blade positioning point, said blade shaft member is again centered about the intersection of the blade lead-lag and flapping axes.

16. A rotor according to claim 2 wherein the stroke of said lead-lag damper and the location of said blade lag stop and said blade lead stop are selected so that as said shaft member is positioned by said bottomed-out lead-lag damper and either said blade lag stop or said blade lead stop, said shaft member centerline is again located at the intersection of said blade lead-lag and said blade flapping axes.

17. A rotor according to claim 3 wherein the stroke of said lead-lag damper and the location of said blade lag stop and said blade lead stop are selected so that when said thru-shaft is being positioned by said bottomed-out lead-lag damper and either said blade lag stop or said blade said lead stop, said thru-shaft centerline intersects the intersection of said blade lead-lag axis, said flapping axis and said feathering axis.

18. A rotor according to claim 4 and wherein the stroke of said lead-lag damper and the location of said blade lag stop and said blade lead stop are selected so that when said thru-shaft is being positioned by said bottomed-out lead-lag damper and either said blade lag stop or said blade lead stop, said thru-shaft centerline intersects the intersection of said blade lead-lag axis, said flapping axis and said feathering axis.

19. A rotor according to claim 5 wherein the stroke of said lead-lag damper and the dimensioning and location of said hub member aperture are selected so that as said shaft member is supported between said bottomed-out damper and said hub member aperture, said shaft member centerline passes through the intersection of said blade lead-lag and flapping axes.

20. A rotor according to claim 6 wherein the stroke of said lead-lag damper and the location of said blade lag stop and said blade lead stop are selected so that when said shaft member is supported between said bottomed-out lead-lag damper and either said blade lag stop or said blade lead stop, the centerline of said shaft member passes through the intersection of the blade flapping and lead-lag axes.

21. A rotor according to claim 7 wherein the stroke of said lead-lag damper and the location of said blade lag stop and said blade lead stop are selected so that when said shaft member is supported between said bottomed-out lead-lag damper and either said blade lag stop or said blade lead stop, the centerline of said shaft member passes through the intersection of the blade flapping and lead-lag axes.

22. A rotor according to claim 8 wherein the stroke of said lead-lag damper and the location of said blade lag stop and said blade lead stop are selected so that when said thru-shaft is supported between said bottomed-out lead-lag damper and either said blade lag stop or said blade lead stop, the centerline of said thru-shaft passes through the intersection of the blade flapping and lead-lag axes.

23. A rotor according to claim 9 wherein the end-shaft of said lead-lag damper and the location of said blade lag stop and said blade lead stop are selected so that when said shaft member is supported between said bottomed-out lead-lag damper and either said blade lag stop or said blade lead stop, the centerline of said shaft member passes through the intersection of the blade flapping and lead-lag axes.

* * * * *